(12) United States Patent
Jayaraman et al.

(10) Patent No.: US 8,898,385 B2
(45) Date of Patent: Nov. 25, 2014

(54) METHODS AND STRUCTURE FOR LOAD BALANCING OF BACKGROUND TASKS BETWEEN STORAGE CONTROLLERS IN A CLUSTERED STORAGE ENVIRONMENT

(75) Inventors: Raja Jayaraman, Fremont, CA (US); James A. Rizzo, Austin, TX (US); Rakesh Chandra, Santa Clara, CA (US); Vinu Velayudhan, Fremont, CA (US); Phillip V. Nguyen, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 226 days.

(21) Appl. No.: 13/432,223

(22) Filed: Mar. 28, 2012

(65) Prior Publication Data

US 2013/0067162 A1 Mar. 14, 2013

Related U.S. Application Data

(60) Provisional application No. 61/532,585, filed on Sep. 9, 2011.

(51) Int. Cl.
*G06F 12/00* (2006.01)
*G06F 3/06* (2006.01)
*G06F 13/28* (2006.01)
*G06F 13/12* (2006.01)
*G06F 13/42* (2006.01)

(52) U.S. Cl.
CPC ............ *G06F 3/0683* (2013.01); *G06F 3/0631* (2013.01); *G06F 2206/1012* (2013.01); *G06F 13/28* (2013.01); *G06F 3/065* (2013.01); *G06F 3/067* (2013.01); *G06F 13/423* (2013.01); *G06F 3/0635* (2013.01); *G06F 3/0613* (2013.01); *G06F 13/12* (2013.01)
USPC .......................................... 711/114; 711/162

(58) Field of Classification Search
CPC ..... G06F 3/067; G06F 3/0617; G06F 3/0635; G06F 3/0653; G06F 3/0689; G06F 3/12; G06F 13/423; G06F 2206/1012; G06F 3/061; G06F 3/0613; G06F 3/0631; G06F 3/065; G06F 3/0683
USPC .................................................. 711/114, 162
See application file for complete search history.

(56) References Cited

U.S. PATENT DOCUMENTS 5,761,705 A * 6/1998 DeKoning et al. ............ 711/113
6,487,646 B1 11/2002 Adams et al.
(Continued)

OTHER PUBLICATIONS

"Common RAID Disk Data Format Specification" Version 2.0 Revision 19 SNIA Technical Position Mar. 27, 2009.
(Continued)

*Primary Examiner* — Hashem Farrokh
(74) *Attorney, Agent, or Firm* — Duft Bornsen & Fettig LLP

(57) ABSTRACT

Methods and structure for load balancing of background tasks between storage controllers are provided. An exemplary active storage controller comprises a front-end interface that receives host Input/Output (I/O) requests directed to a logical volume, a back-end interface that couples with one or more of storage devices provisioning the logical volume, and a control unit. The control unit processes the host I/O requests directed to the logical volume, identifies a background processing task distinct from the host I/O requests and related to the logical volume, and assigns the background processing task to a passive storage controller for processing.

13 Claims, 4 Drawing Sheets

(56) References Cited

U.S. PATENT DOCUMENTS

| | | | |
|---|---|---|---|
| 6,625,750 B1 * | 9/2003 | Duso et al. | 714/11 |
| 6,651,154 B1 | 11/2003 | Burton et al. | |
| 6,654,831 B1 * | 11/2003 | Otterness et al. | 710/74 |
| 6,738,872 B2 | 5/2004 | Van Huben et al. | |
| 6,754,739 B1 | 6/2004 | Kessler et al. | |
| 6,944,785 B2 | 9/2005 | Gadir et al. | |
| 7,058,846 B1 | 6/2006 | Kelkar et al. | |
| 7,213,102 B2 | 5/2007 | Buchanan, Jr. et al. | |
| 7,418,550 B2 | 8/2008 | Hetrick et al. | |
| 7,480,941 B1 | 1/2009 | Balasubramaniam et al. | |
| 7,814,065 B2 | 10/2010 | Chan et al. | |
| 8,001,242 B2 | 8/2011 | Mild et al. | |
| 8,041,735 B1 | 10/2011 | Lacapra et al. | |
| 8,190,816 B2 | 5/2012 | Balasubramanian et al. | |
| 8,250,257 B1 * | 8/2012 | Harel et al. | 710/38 |
| 8,261,003 B2 | 9/2012 | Young et al. | |
| 2002/0103964 A1 | 8/2002 | Igari | |
| 2004/0205074 A1 | 10/2004 | Berkery et al. | |
| 2005/0097324 A1 | 5/2005 | Mizuno | |
| 2005/0125557 A1 | 6/2005 | Vasudevan et al. | |
| 2005/0188421 A1 | 8/2005 | Arbajian | |
| 2005/0240928 A1 | 10/2005 | Brown et al. | |
| 2007/0015589 A1 | 1/2007 | Shimizu | |
| 2007/0067497 A1 | 3/2007 | Craft et al. | |
| 2007/0210162 A1 | 9/2007 | Keen et al. | |
| 2007/0245104 A1 * | 10/2007 | Lindemann et al. | 711/162 |
| 2009/0119364 A1 | 5/2009 | Guillon | |
| 2009/0222500 A1 | 9/2009 | Chiu et al. | |
| 2010/0185874 A1 | 7/2010 | Robles et al. | |
| 2010/0191873 A1 | 7/2010 | Diamant | |
| 2010/0274977 A1 | 10/2010 | Schnapp et al. | |
| 2011/0178983 A1 | 7/2011 | Bernhard et al. | |
| 2011/0225371 A1 | 9/2011 | Spry | |
| 2012/0159646 A1 | 6/2012 | Hong Chi et al. | |
| 2012/0173822 A1 * | 7/2012 | Testardi et al. | 711/135 |
| 2012/0216299 A1 | 8/2012 | Frank | |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

US 8,898,385 B2

METHODS AND STRUCTURE FOR LOAD BALANCING OF BACKGROUND TASKS BETWEEN STORAGE CONTROLLERS IN A CLUSTERED STORAGE ENVIRONMENT

This patent claims priority to U.S. provisional patent application No. 61/532,585, filed on 9 Sep. 2011 and titled "10 Shipping for RAID Virtual Disks Created On A Disk Group Shared Across Cluster," which is hereby incorporated by reference.

BACKGROUND

1. Field of the Invention

The invention relates generally to clustered storage systems and more specifically relates to distribution of background processing tasks for storage controllers managing a logical volume in an active-passive configuration.

2. Related Patents

This patent application is related to the following commonly owned U.S. patent applications, all filed on the same date herewith and all of which are herein incorporated by reference:

- U.S. patent application Ser. No. 13/432,131 (filed Mar. 28, 2012), entitled METHODS AND STRUCTURE FOR TASK MANAGEMENT IN STORAGE CONTROLLERS OF A CLUSTERED STORAGE SYSTEM;
- U.S. patent application Ser. No. 13/432,213 (filed Mar. 28, 2012), entitled METHODS AND STRUCTURE FOR DIRECT PASS THROUGH OF SHIPPED REQUESTS IN FAST PATH CIRCUITS OF A STORAGE CONTROLLER IN A CLUSTERED STORAGE SYSTEM;
- U.S. patent application Ser. No. 13/432,225 (filed Mar. 28, 2012), entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;
- U.S. patent application Ser. No. 13/432,232 (filed Mar. 28, 2012), entitled METHODS AND STRUCTURE FOR IMPLEMENTING LOGICAL DEVICE CONSISTENCY IN A CLUSTERED STORAGE SYSTEM;
- U.S. patent application Ser. No. 13/432,238 (filed Mar. 28, 2012), entitled METHODS AND STRUCTURE FOR IMPROVED I/O SHIPPING IN A CLUSTERED STORAGE SYSTEM;
- U.S. patent application Ser. No. 13/432,220 (filed Mar. 28, 2012), entitled METHODS AND STRUCTURE FOR MANAGING VISIBILITY OF DEVICES IN A CLUSTERED STORAGE SYSTEM;
- U.S. patent application Ser. No. 13/432,150 (filed Mar. 28, 2012), entitled METHODS AND STRUCTURE FOR IMPROVED BUFFER ALLOCATION IN A STORAGE CONTROLLER; and
- U.S. patent application Ser. No. 13/432,138 (filed Mar. 28, 2012), entitled METHODS AND STRUCTURE FOR RESUMING BACKGROUND TASKS IN A CLUSTERED STORAGE ENVIRONMENT.

3. Discussion of Related Art

In the field of data storage, customers demand highly resilient data storage systems that also exhibit fast recovery times for stored data. One type of storage system used to provide both of these characteristics is known as a clustered storage system.

A clustered storage system typically comprises a number of storage controllers, wherein each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase overall speed of the clustered storage system. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, the speed of a storage system still typically remains a bottleneck to the overall speed of a processing system utilizing the storage system.

For example, a storage controller may receive a large number of host Input/Output (I/O) requests for processing directed to a logical volume, and may also have a number of background tasks (unrelated to the host I/O processing) to perform. For example, a background task could comprise a patrol read of a storage device, an expansion of a logical volume, or an initialization related to a logical volume. If the logical volume is a RAID volume, the potential background tasks could further comprise consistency checks for the logical volume, a rebuild for the logical volume, or a migration of the logical volume from one RAID level to another (i.e., a migration to a different RAID configuration).

If the storage controller is processing a large number of host I/O requests, the host I/O requests may be delayed by the ongoing background tasks, which in turn degrades system performance for users. Alternatively, the background tasks may be delayed and the host I/O requests may be prioritized. However, delaying background tasks may delay the detection of errors at the logical volume, which impacts the stability of the clustered storage system.

Thus it is an ongoing challenge to increase the performance of clustered storage systems.

SUMMARY

The present invention solves the above and other problems, thereby advancing the state of the useful arts, by providing methods and structure for active storage controllers to pass background tasks related to a logical volume to passive storage controllers for processing.

When storage controllers are arranged in an active-passive configuration, the active storage controller processes incoming host I/O requests directed to a logical volume. The passive storage controller awaits a failure of the active storage controller, and is capable of assuming control over the logical volume if such a failure occurs. However, the passive storage controller does not process incoming host I/O requests.

According to embodiments discussed herein, by passing background tasks to the passive storage controller, the active storage controller continues to manage host I/O requests (i.e., it continues to perform as an active controller), but does not have to waste processing resources by performing routine background tasks relating to the logical volume. Background tasks relating to a logical volume comprise background tasks that include processing directed to any or all storage devices that provision the logical volume. Offloading this processing burden increases the performance of the active storage controller in processing received host I/O requests.

In one aspect hereof, a method operable in a storage controller for managing a logical volume is provided (the logical volume is provisioned on one or more storage devices). The method comprises receiving host Input/Output (I/O) requests directed to a logical volume and processing the host I/O requests directed to the logical volume. The method further comprises identifying a background processing task distinct from the host I/O requests and related to the logical volume. Additionally, the method comprises assigning the background processing task to a passive storage controller for processing, the passive storage controller coupled for communication with the storage devices provisioning the logical volume.

Another aspect hereof provides a storage controller. The storage controller comprises a front-end interface operable to that receive host Input/Output (I/O) requests directed to a logical volume, a back-end interface operable to couple with one or more of storage devices provisioning the logical volume, and a control unit. The control unit is operable to process the host I/O requests directed to the logical volume, to identify a background processing task distinct from the host I/O requests and related to the logical volume, and to assign the background processing task to a passive storage controller for processing.

Another aspect hereof provides a storage system comprising one or more storage devices and two storage controllers coupled with the one or more storage devices. The two storage controllers are coupled with the storage devices and are operable to manage, in an active-passive configuration, a logical volume provisioned on the one or more storage devices. The active storage controller is operable to process host Input/Output (I/O) requests directed to the logical volume. The active storage controller is further operable to identify a background processing task distinct from the host I/O requests and related to the logical volume, and to assign the background processing task to the passive storage controller for processing. The passive storage controller is operable to perform the assigned background processing task.

DETAILED DESCRIPTION OF THE DRAWINGS

Figure 1:
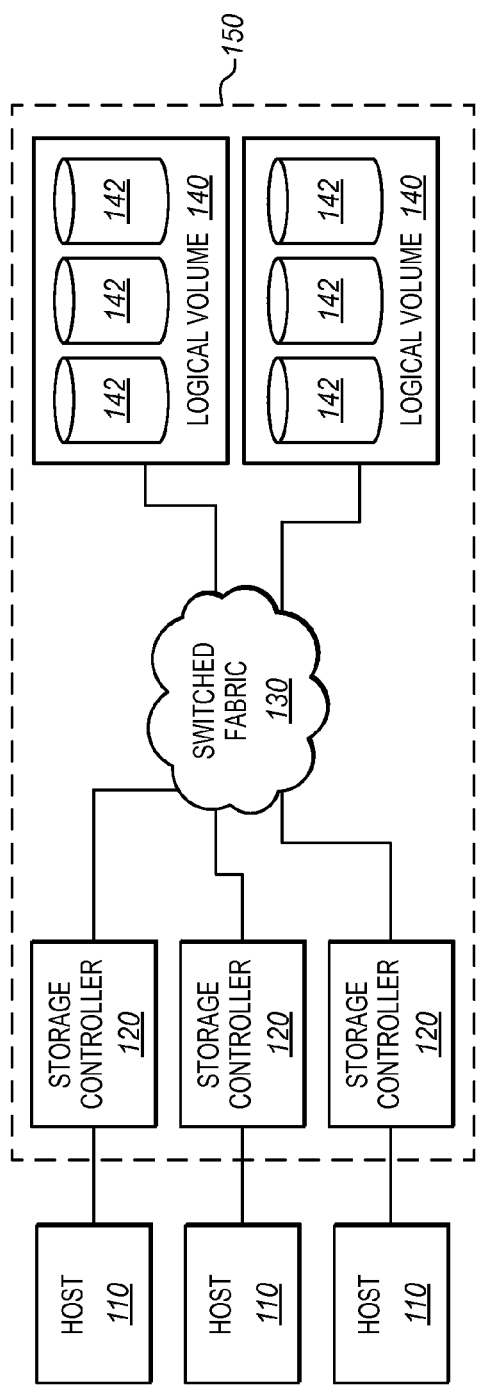
FIG. 1 is a block diagram illustrating an example of a prior art clustered storage system.
Figure 2:
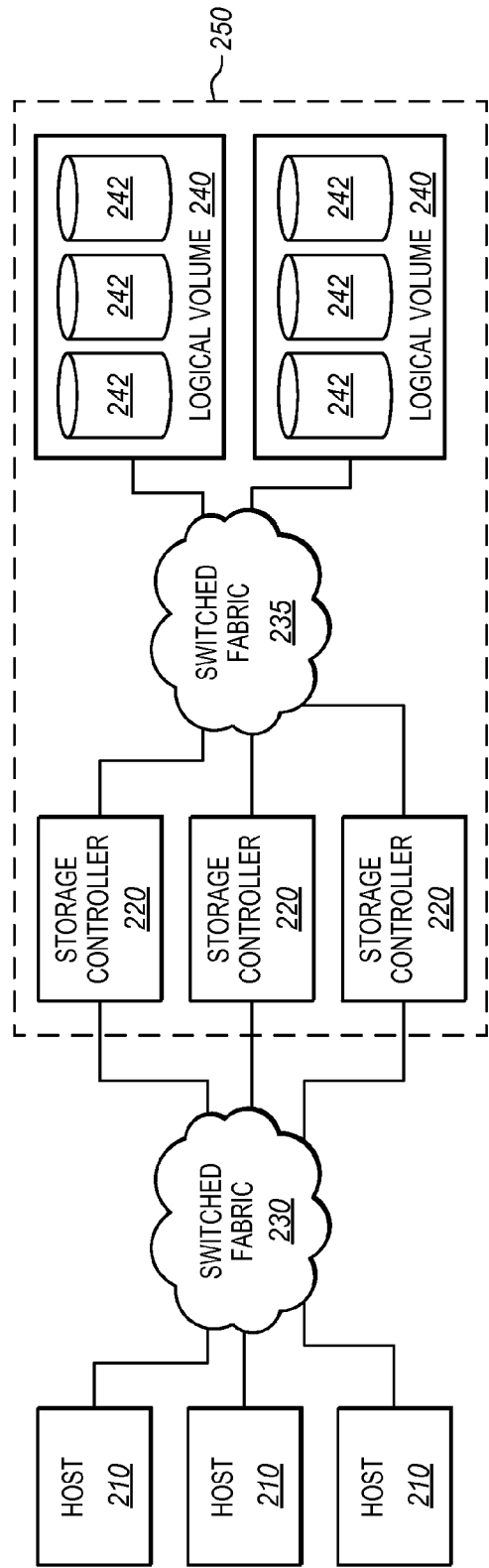
FIG. 2 is a block diagram illustrating another example of a prior art clustered storage system.
Figure 3:
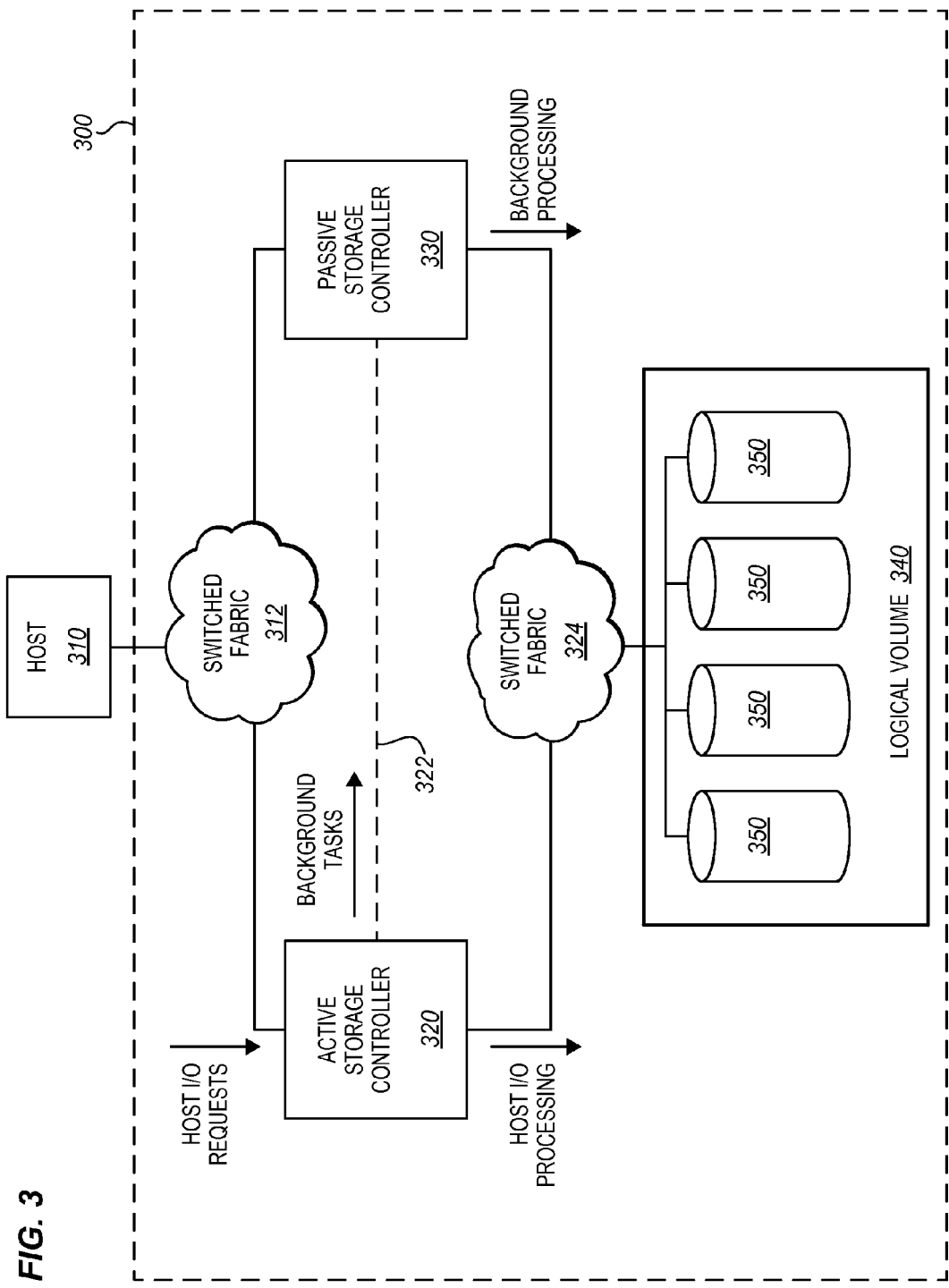
FIG. 3 is a block diagram of an exemplary storage system in accordance with features and aspects hereof.

FIG. 3 is a block diagram of an exemplary storage system 300 in accordance with features and aspects hereof. According to FIG. 3, storage system 300 receives input from a host 310, and comprises switched fabrics 312 and 324, active storage controller 320, passive storage controller 330, logical volume 340, and storage devices 350 provisioning logical volume 340. Active storage controller 320 of storage system 300 is operable to assign background tasks to passive storage controller 330, thereby freeing processing resources at active storage controller 320 in order to process incoming host Input/Output (I/O) requests.

Storage controller 320 may receive host I/O requests via switched fabric 312, and may communicate with storage controller 330 as indicated by dashed line 322. Any suitable communication medium and protocol may be used to carry these communications between storage controllers 320 and 330 as indicated by dashed line 322. For example, such communications may utilize a dedicated channel for intercontroller communications, or may utilize a signaling pathway along switched fabric 324 or 312. Storage controllers 320 and 330 utilize switched fabric 324 to manage logical volume 340 provisioned on storage devices 350.

Host 310 may comprise any suitable system capable of performing processing operations upon stored data. For example, host 310 may comprise a processor implementing programmed instructions or custom circuitry implementing logic for performing a task. Host 310 is communicatively coupled with switched fabric 312 via a communication channel, and may provide host I/O requests to storage controller 320. Upon failure of storage controller 320, host 310 may provide host I/O requests to storage controller 330 via switched fabric 312 (e.g., during/after storage controller 330 assumes the active role). Host I/O requests directed to a logical volume include requests to provide data from the logical volume to a host as well as requests to modify or write data in the logical volume.

Switched fabric 312 and switched fabric 324 comprise any suitable combination of communication channels operable to forward communications, for example, according to protocols for one or more of Serial Attached SCSI (SAS), Fibre-Channel, Ethernet, ISCSI, etc. Switched fabric 312 and switched fabric 324 may be distinct from, or integral with, each other as a matter of design choice.

Active storage controller 320 is operable to receive host I/O requests via switched fabric 312, and to perform operations upon storage devices 350 provisioning logical volume 340 based upon those requests. Passive storage controller 330 is operable to await failure of active storage controller 320, and to assume control of logical volume 340 upon failure of active storage controller 320. Because storage controller 330 is operating in a passive mode, storage controller 330 does not process incoming host I/O requests directed to logical volume 340. However, in some embodiments such as a clustered storage environment, passive storage controller 330 may be considered passive with respect to logical volume 340, yet active with respect to a different logical volume.

Logical volume 340 comprises allocated storage space and data provisioned on storage devices 350. While in this embodiment logical volume 340 is provisioned using all shown storage devices 350, logical volume 340 may be provisioned on a greater or lesser number of storage devices 350 as a matter of design choice. Furthermore, storage devices 350 need not be dedicated to only logical volume 340, but may also store data for a number of other logical volumes. Typically, logical volume 340 will be configured as a Redundant Array of Independent Disks (RAID) volume in order to enhance the performance and/or reliability of data stored at logical volume 340.

Storage devices 350 provision the storage capacity of logical volume 340, and may comprise any media and/or interfaces capable of storing and/or retrieving data in a computer-readable format. For example, storage devices 350 may comprise magnetic hard disks, solid state drives, optical media, etc. compliant with protocols for one or more of SAS, SATA, Fibre Channel, etc. The number of storage devices utilized by storage system 300 may vary as a matter of design choice.

While in operation, active storage controller 320 of storage system 300 is capable of processing incoming host I/O requests directed to logical volume 340. Additionally, active storage controller 320 is capable of determining that a background task distinct from the host I/O requests and related to logical volume 340 should be performed. However, instead of wasting processing resources that could be used for host I/O requests by performing the background task itself, storage controller 320 is capable of assigning the background task to passive storage controller 330. The background task may be assigned, for example, via communications indicated by dashed line 322.

As used herein, the term "background task" refers to a processing task that is distinct from host I/O requests directed to logical volume 340. For example, a background task could comprise a patrol read of a storage device 350, an expansion of logical volume 340, or an initialization related to logical volume 340. If logical volume 340 is a RAID volume, the potential background tasks could further comprise consistency checks for logical volume 340, a rebuild for logical volume 340, or a migration of logical volume 340 to a different RAID level.

Background tasks are typically initiated by internal firmware triggers at a storage controller based upon firmware, initiated by a management component of storage system 300, etc. A host may also schedule certain background tasks, but the background tasks are not triggered by host I/O requests directed to a logical volume (because scheduling the background task does not request a modification to the data stored on the logical volume).

A background task is distinct from host I/O requests directed to a logical volume. For example, some background tasks (e.g., patrol reads, consistency checks, initializations) involve reading data from storage devices provisioning the logical volume, but do not involve providing the read data to a host or even writing any data to the storage devices. Other background tasks (e.g., migrations, expansions, rebuilds) involve writing to storage devices to alter the way in which the logical volume is stored on the storage devices, but similarly do not involve modifying the data stored for the logical volume (i.e., to the host, there is no change in the data stored on the volume). Thus, to a host system, background tasks are generally undetectable because they do not alter the data stored for the logical volume nor do they provide data that has been read from the logical volume to a host.

Figure 4:
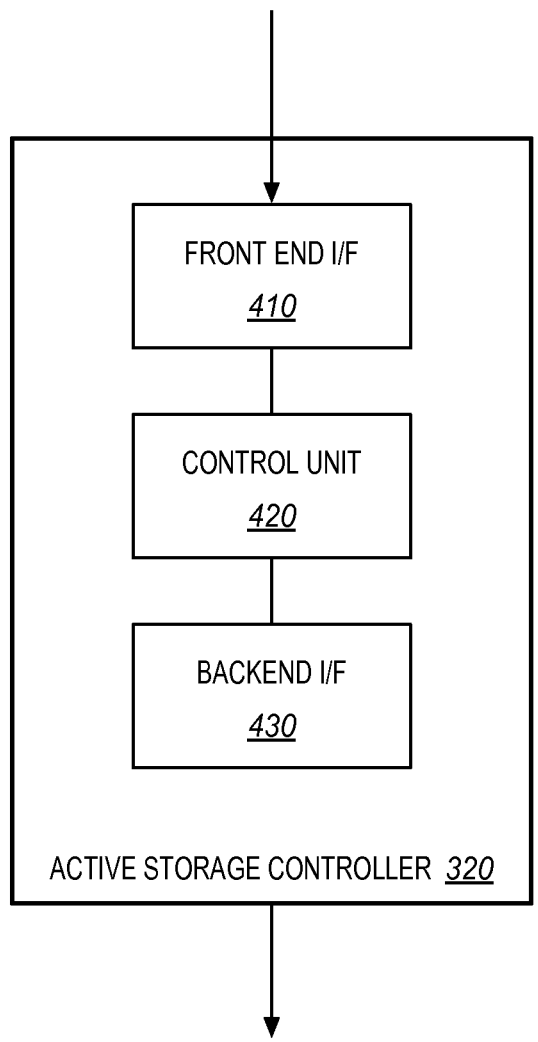
FIG. 4 is a block diagram of an exemplary storage controller in accordance with features and aspects hereof.

FIG. 4 is a block diagram of an exemplary storage controller 320 in accordance with features and aspects hereof FIG. 4 may be equally applicable to an exemplary storage controller 330. According to this embodiment, active storage controller 320 comprises frontend Interface (I/F) 410, control unit 420, and backend Interface (I/F) 430. Frontend I/F 410 comprises any communication channel suitable for receiving host I/O requests directed to a logical volume (e.g., logical volume 340 of FIG. 3). Backend I/F comprises any communication channel suitable for directing the operations of storage devices implementing the logical volume (e.g., storage devices 350 of FIG. 3). Intercontroller exchanges used by control unit 420 for exchange of background tasks may be performed using frontend I/F 410, backend I/F 430, or may use a separate dedicated intercontroller communication channel (not shown).

Control unit 420 is operable to process received host I/O requests and determine operations to perform upon the storage devices based upon the received host I/O requests. Further, control unit 420 is capable of determining that a background task should be performed relating to the logical volume, and to pass the background task to a passive storage controller (e.g., passive storage controller 330 of FIG. 3) for processing. This frees up processing resources at active storage controller 320, enabling the processing of a greater number of host I/O requests than was previously possible by active storage controller 320. At the same time, background tasks for the storage system are performed in a timely manner at the passive storage controller.

In some embodiments, control unit 420 may further be operable to determine a workload at the passive storage controller. This workload may comprise, for example, a number of queued or active background tasks currently being processed at the passive storage controller, a measure of processor utilization at the passive storage controller, or any suitable indicia of the processing burden of the passive storage controller. Thus, if the passive storage controller is currently already experiencing heavy load, control unit 420 may elect to assign the background task to another communicatively coupled passive storage controller or to perform the task at active storage controller 320. For example, this may occur if the passive storage controller has a significant workload of background tasks, but active storage controller 320 has a minimal amount of host I/O to process.

Storage controller 320 may be communicatively coupled with any number of passive storage controllers, so it may be desirable to determine which passive storage controller is the most appropriate one to process a given background task. In such cases, control unit 420 may determine a workload at each of multiple passive storage controllers, and assign the background task to a passive storage controller currently experiencing a lighter workload.

In another embodiment, a passive storage controller may maintain progress information indicating how much of the background task has been completed at a given time (this may occur, for example, based on an instruction from active storage controller 320). In this manner, if the passive storage controller later becomes an active storage controller, the newly active storage controller may pass the task to another passive storage controller for completion. The other passive storage controller may then resume processing of the background task.

Figure 5:
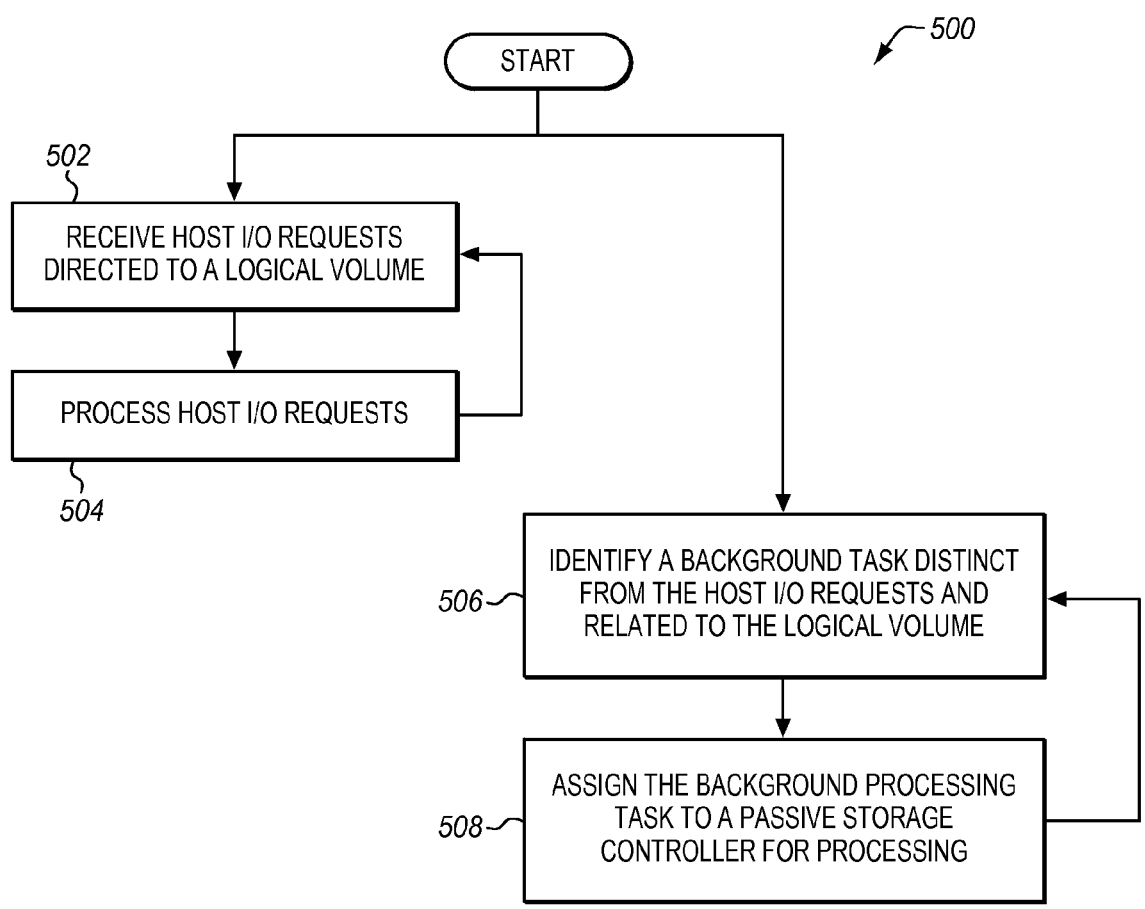
FIG. 5 is a flowchart describing an exemplary method in accordance with features and aspects hereof to assign background tasks to passive storage controllers.

FIG. 5 is a flowchart describing an exemplary method 500 in accordance with features and aspects hereof to assign background tasks to passive storage controllers. Method 500 of FIG. 5 may be operable in a storage system such as described above with regard to FIG. 3. According to FIG. 5, steps 502 and 504 may be implemented in parallel with, and asynchronously from, steps 506-510. Thus, steps 502 and 504 represent one ongoing (and iteratively operable) process that may occur at the same or different times than another ongoing (and iteratively operable) process represented by steps 506-510.

Step 502 comprises receiving, at an active storage controller, host I/O requests directed to a logical volume. These requests may be received from any suitable host system (e.g., a server implementing a software service, a personal computer, etc.). Step 504 comprises processing the host I/O requests. This may comprise writing to and/or reading from the storage devices implementing the logical volume in order to provide stored data to a host or to modify data stored on the logical volume. In circumstances wherein a stream of host requests are being provided to the storage controller, previously received host I/O requests may be processed in step 504 at substantially the same time as new host I/O requests are received in step 502.

While host I/O is being received and processed in steps 502 and 504, the active storage controller waits for a triggered background task. An independent event may trigger a background task. For example, the background task may be triggered based upon internal firmware operations at the active storage controller, based upon an administrative user (e.g., via a debug or administrative input) requesting the background task, based upon the results of a prior background task, based upon an error rate for operations performed on the storage devices implementing the logical volume, based upon a timer, etc. Therefore, step 506 comprises identifying the background task based on, for example, the above triggers. This background task, identified at the active storage controller, is a background task distinct from the host I/O requests and is related to the logical volume.

Step 508 comprises assigning, via the active storage controller, the background task to a passive storage controller for processing. The passive storage controller may, for example, receive the assignment of the background task via a dedicated communication channel or via a switched fabric. Assignment of the background task may comprise transmitting an indicator of the type of task to perform and the storage devices and/or volume to perform the task on, and may comprise further information indicating parameters for performing the background task. Further, the assignment may include an instruction to the passive storage controller to report completion of the task to the active storage controller.

Depending on the type of background task to be initiated and the particular methods implemented to perform the task, it may be useful or necessary to quiesce further operations on the affected logical volume or on particular affected storage devices of the logical volume. To quiesce further operations, the controller that owns the affected volume or devices may signal to host systems that the volume is "off line" or otherwise disabled so that no new requests will be received. The controller that owns the affected volume or devices may then complete all presently active and queued requests (and may complete the requests successfully or fail them as appropriate). Having so quiesced the affected volume or devices, the controller may then transfer the background task to the passive controller.

After the background task has been assigned, processing may continue from step 508 to step 506, wherein the active storage controller awaits the triggering of a new background task.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage controller comprising:
    a front-end interface operable to receive host Input/Output (I/O) requests directed to a logical volume;
    a back-end interface operable to couple with one or more of storage devices provisioning the logical volume; and
    a control unit operable to process the host I/O requests directed to the logical volume, the control unit further operable to perform a background processing task distinct from the host I/O requests and related to the logical volume, to store progress information describing progress of the background task, to determine whether to assign the background processing task to a passive controller based upon a workload of the passive storage controller, to assign the background processing task to the passive storage controller via the backend interface, and to direct the passive storage controller to resume processing of the background processing task based on the progress information.

2. The storage controller of claim 1, wherein:
    the background processing task comprises at least one of a patrol read, an expansion, or an initialization.

3. The storage controller of claim 1, wherein:
    the logical volume is a Redundant Array of Independent Disks (RAID) volume, and
    the background processing task comprises at least one of a consistency check, a rebuild, or a migration from one RAID level to another.

4. The storage controller of claim 1, wherein:
    the control unit is further operable to determine a workload for another passive storage controller, and to select the other passive storage controller to assign the background processing task to based upon the determined workloads.

5. The storage controller of claim 1, wherein:
the control unit is further operable to determine whether to assign the background processing task to the passive storage controller based upon a workload for the control unit.

6. The storage controller of claim 1, wherein:
the background processing task is internally triggered at the control unit.

7. A storage system comprising:
a plurality of storage devices; and
two storage controllers coupled with the one or more storage devices, the storage controllers operable to manage, in an active-passive configuration, a logical volume provisioned on the storage devices,
the active storage controller operable to process host Input/Output (I/O) requests directed to the logical volume, the active storage controller further operable to
perform a background processing task distinct from the host I/O requests and related to the logical volume, to store progress information describing progress of the background task, to determine whether to assign the background processing task to a passive controller based upon a workload of the passive storage controller, to assign the background processing task to the passive storage controller via the backend interface, and to direct the passive storage controller to resume processing of the background processing task based on the progress information.

8. The storage system of claim 7, wherein:
the background processing task comprises at least one of a patrol read, an expansion, or an initialization.

9. The storage system of claim 7, wherein:
the logical volume is a Redundant Array of Independent Disks (RAID) volume, and the background processing task comprises at least one of a consistency check, a rebuild, or a migration from one RAID level to another.

10. The storage system of claim 7, wherein:
the active storage controller is further operable to determine a workload for another passive controller, and to select the other passive storage controller to assign the background processing task to based upon the determined workloads.

11. The storage system of claim 7, wherein:
the active storage controller is further operable to determine whether to assign the background processing task to the passive controller based upon a workload for the active storage controller.

12. The storage system of claim 7, wherein:
the background processing task is internally triggered at the active storage controller.

13. A method operable in a storage controller for managing a logical volume provisioned on one or more storage devices, the method comprising:
receiving host Input/Output (I/O) requests directed to a logical volume;
processing the host I/O requests directed to the logical volume;
processing a background processing task distinct from the host I/O requests and related to the logical volume;
storing progress information describing progress of the background task, determining whether to assign the background processing task to a passive controller based upon a workload of the passive storage controller;
assigning the background processing task to the passive storage controller via the backend interface; and
directing the passive storage controller to resume processing of the background processing task based on the progress information.

* * * * *